(12) United States Patent
Zafarana

(10) Patent No.: US 11,881,787 B2
(45) Date of Patent: *Jan. 23, 2024

(54) METHOD AND SYSTEM OF A POWER CONVERTER WITH SECONDARY SIDE ACTIVE CLAMP

(71) Applicant: SEMICONDUCTOR COMPONENTS INDUSTRIES, LLC, Phoenix, AZ (US)

(72) Inventor: Alessandro Zafarana, Milan (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,094

(22) Filed: Apr. 28, 2022

(65) Prior Publication Data

US 2022/0255448 A1 Aug. 11, 2022

Related U.S. Application Data

(63) Continuation of application No. 17/249,439, filed on Mar. 2, 2021, now Pat. No. 11,349,401.

(Continued)

(51) Int. Cl.
*H02M 3/335* (2006.01)
*H02M 1/08* (2006.01)
(Continued)

(52) U.S. Cl.
CPC ....... *H02M 3/33576* (2013.01); *H02M 1/083* (2013.01); *H02M 1/342* (2021.05);
(Continued)

(58) Field of Classification Search
CPC .......... H02M 3/33576; H02M 1/083; H02M 3/335–337; H02M 1/0058; H02M 1/342;
(Continued)

(56) References Cited

U.S. PATENT DOCUMENTS 4,953,068 A * 8/1990 Henze ............... H02M 3/33584
363/127
5,351,179 A * 9/1994 Tsai ..................... H02M 3/335
363/126

(Continued)

OTHER PUBLICATIONS

"The XDPP1100 digital power supply controller"; Infineon Application Note XDPP1100, Document Ref. No. AN_2003_PL88_2006_221026; Jun. 22, 2020; 245 pages; Copyright 2020 Infineon Technologies AG.

(Continued)

*Primary Examiner* — Yusef A Ahmed
(74) *Attorney, Agent, or Firm* — Dickinson Wright PLLC; Mark E. Scott

(57) ABSTRACT

A power converter with secondary side active clamp. At least one example is a method including: limiting a push-phase voltage excursion of a phase node on a secondary side of a power converter during a push phase of a primary side of the power converter, the limiting by extracting current from the phase node and storing the current on a clamp capacitor; limiting a pull-phase voltage excursion of the phase node on the secondary side of the power converter during a pull phase of the primary side of the power converter, the limiting by extracting current from the phase node and storing the current on a clamp capacitor; and utilizing the current stored on the clamp capacitor to drive a component on the secondary side.

20 Claims, 9 Drawing Sheets

Related U.S. Application Data

(60) Provisional application No. 63/199,788, filed on Jan. 25, 2021.

(51) Int. Cl.
    *H02M 3/337*       (2006.01)
    *H02M 1/34*        (2007.01)
    *H02M 1/00*        (2006.01)

(52) U.S. Cl.
    CPC ....... *H02M 3/337* (2013.01); *H02M 3/33573* (2021.05); *H02M 1/0058* (2021.05)

(58) Field of Classification Search
    CPC ............... H02M 3/33573; H02M 1/08; H02M 3/33571; Y02B 70/10
    See application file for complete search history.

(56) References Cited

U.S. PATENT DOCUMENTS

| | | | |
|---|---|---|---|
| 6,771,521 B1 * | 8/2004 | Xiong | H02M 3/33592 363/21.06 |
| 7,606,051 B1 * | 10/2009 | Wittenbreder, Jr. | H02M 3/33576 363/21.04 |
| 9,112,422 B1 * | 8/2015 | Vinciarelli | H02M 3/33507 |
| 9,641,089 B2 * | 5/2017 | Higaki | H02M 3/33584 |
| 10,250,119 B1 * | 4/2019 | Chen | H02M 3/33576 |
| 10,305,363 B1 * | 5/2019 | Chen | H02M 1/08 |
| 10,554,137 B2 * | 2/2020 | Higaki | H02M 3/33546 |
| 10,658,937 B1 * | 5/2020 | Zafarana | H02M 3/33592 |
| 10,673,343 B1 * | 6/2020 | Tong | H02M 3/3376 |
| 10,770,983 B2 * | 9/2020 | Sen | G01R 19/2509 |
| 11,128,223 B1 * | 9/2021 | Chen | H02M 3/33592 |
| 11,349,401 B1 * | 5/2022 | Zafarana | H02M 1/342 |
| 2006/0139823 A1 * | 6/2006 | Shoji | H02M 1/34 361/56 |
| 2011/0280048 A1 * | 11/2011 | Fujiyoshi | H02M 3/33571 363/21.04 |
| 2011/0317452 A1 * | 12/2011 | Anguelov | H02M 3/33592 363/21.02 |
| 2012/0249059 A1 * | 10/2012 | Matsumae | H02M 3/33573 363/17 |
| 2013/0063982 A1 * | 3/2013 | Ye | H02M 3/33592 363/21.06 |
| 2015/0381075 A1 * | 12/2015 | Qu | H02M 3/33576 363/132 |
| 2016/0087541 A1 * | 3/2016 | Xie | H02M 3/33592 363/21.06 |
| 2018/0054136 A1 * | 2/2018 | Jimichi | H02M 3/33584 |
| 2018/0138819 A1 * | 5/2018 | Schekulin | H02M 3/33584 |
| 2019/0028035 A1 * | 1/2019 | Choi | H02M 3/33573 |
| 2019/0207527 A1 * | 7/2019 | Norisada | H02M 7/797 |
| 2020/0076316 A1 * | 3/2020 | Jin | H02M 3/3378 |
| 2020/0153350 A1 * | 5/2020 | Yoshimitsu | H02M 1/08 |
| 2021/0083588 A1 * | 3/2021 | Yaegaki | H02M 1/32 |
| 2021/0273571 A1 * | 9/2021 | Chen | H02M 3/33592 |

OTHER PUBLICATIONS

"Design of a 100 W Active Clamp Forward DC-DC Converter for Telecom Systems Using the NCP1562"; ON Semiconductor Application Note AND8273/D; Apr. 2020—Rev. 4; 21 pages; Copyright Semiconductor Components Industries, LLC 2013.

* cited by examiner

METHOD AND SYSTEM OF A POWER CONVERTER WITH SECONDARY SIDE ACTIVE CLAMP

CROSS-REFERENCE TO RELATED APPLICATIONS

This application is a continuation of U.S. application Ser. No. 17/249,439 filed Mar. 2, 2021 titled "Method and System of a Power Converter With Secondary Side Active Clamp" (Now U.S. Pat. No. 11,349,401). The '439 application claims the benefit of U.S. Provisional App. 63/199,788 filed Jan. 25, 2021 titled "Method and System of a Power Converter With Secondary Side Active Clamp." Both applications are incorporated by reference herein as if reproduced below in full.

BACKGROUND

Switching power converters may implement half-bridge and full-bridge topologies on the primary side. In half-bridge topologies, two transistors are used to alternately couple an input voltage to a primary winding to drive current through the primary winding and to a capacitor, and then couple the primary winding such that current stored on the capacitor flows through the primary winding in the opposite direction. In the full-bridge topologies, four transistors are used to alternately couple the input voltage across the primary winding in a first and the opposite polarity.

Regardless of the topology, leakage inductance of the transformer creates current spikes on the secondary side. The magnitude of the current spikes are based not only on the magnitude of the leakage inductance, but also on the turns ratio of the transformer. In the case of active rectification on the secondary side, the current spikes (and corresponding voltage excursions) force designers to use transistors with drain-to-source breakdown voltages many times the voltage output of the power converter.

BRIEF DESCRIPTION OF THE DRAWINGS

For a detailed description of example embodiments, reference will now be made to the accompanying drawings in which.

DEFINITIONS

Figure 1:
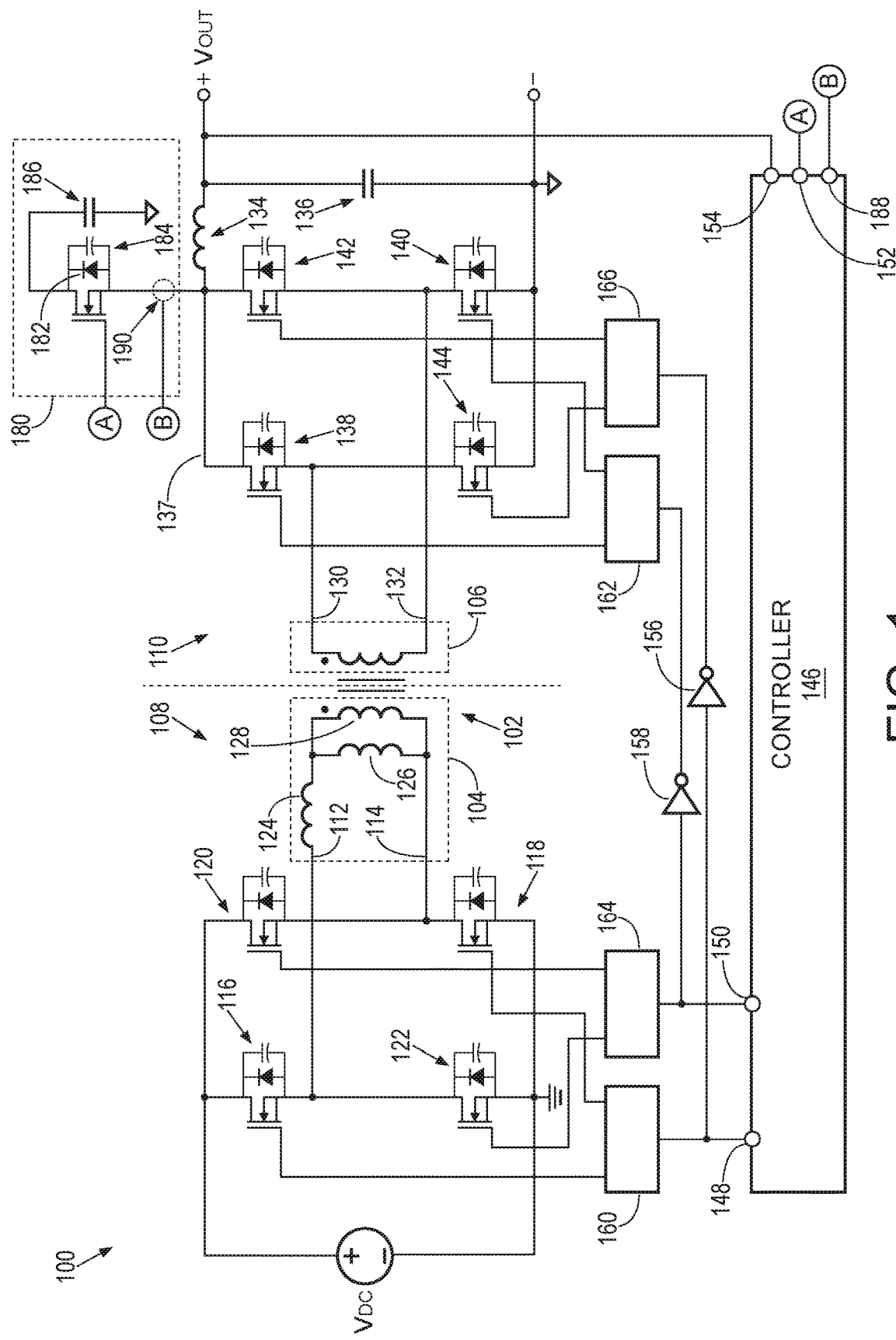
FIG. 1 shows a partial electrical schematic, partial block diagram, of an FB-FB isolated power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software (e.g., a reduced-instruction-set computing (RISC) processor core), a digital signal processor (DSP), process with controlling software, a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to methods and systems of a power converter with a secondary side active clamp. More particularly, example embodiments are directed to isolated power converters with active rectifiers on the secondary side, and a clamp circuit on the secondary side that limits voltage excursions on the phase node of the secondary side by diverting or extracting current from the phase node, and directing the current to a clamp capacitor. More particularly still, example systems limit voltage excursions of the phase node by extracting current from the phase node. Example systems utilize the extracted current to drive one or more components on the secondary side, such as the driving a clamp transistor of the clamping circuit. The various embodiments were developed in the context of a full-bridge to full-bridge (FB-FB) isolated power converter, and the description that follows is based on the developmental context. Thus, the specification turns to an example FB-FB isolated power converter to orient the reader.

FIG. 1 shows a partial electrical schematic, partial block diagram, of an example FB-FB isolated power converter (hereafter just power converter 100). In particular, the example power converter 100 comprises a transformer 102 with a primary winding 104 and a secondary winding 106. The transformer 102 electrically delineates a primary side 108 of the power converter 100, and a secondary side 110 of the power converter 100. The example primary side 108 comprises in an input voltage $V_{DC}$. In one example, the power converter 100 is designed and constructed for use in telecommunication systems, and thus the input voltage $V_{DC}$ may range from 38V to 60V.

The example primary side 108 includes a full bridge, and thus includes four electrically-controlled switches used to alternately couple the input voltage $V_{DC}$ to the primary winding 104 in a first polarity and then an opposite polarity. In many cases, the electrically-controlled switches are transistors, and in one example the electrically-controlled switches are field-effect transistors (FETs). Hereafter, the electrically-controlled switches on the primary side 108 are discussed as FETs with the understanding that any suitable electrically-controlled switch may be used. The example primary winding 104 of the transformer 102 defines a lead 112 and a lead 114. The FETs are arranged to couple the input voltage $V_{DC}$ to the leads 112 and 114 in two polarities. In a first polarity, the positive terminal of the input voltage $V_{DC}$ is coupled to the lead 112, and the negative terminal of the input voltage $V_{DC}$ is coupled to the lead 114. Coupling the positive terminal of the input voltage $V_{DC}$ to the lead 112 and the negative terminal to the lead 114 is hereafter referred to as the "push phase."

In the opposite polarity, the positive terminal of the input voltage $V_{DC}$ is coupled to the lead 114, and the negative terminal of the input voltage $V_{DC}$ is coupled to the lead 112. Coupling the negative terminal of the input voltage $V_{DC}$ to the lead 114 and the positive terminal to the lead 112 is hereafter referred to as the "pull phase." It follows that in the example push phase current from the input voltage $V_{DC}$ is pushed through primary winding 104 from the lead 112 to the lead 114, and in the example pull phase current flows through the primary winding 104 in the opposite direction. The designation of push and pull is arbitrary, but is introduced to help in a nomenclature regarding the FETs on the primary side 108, as wells as naming the rectifiers on the secondary side 110.

The example primary side 108 comprises a push-high FET 116 having a drain coupled to the positive terminal of the input voltage $V_{DC}$, a source coupled to the lead 112 of the primary winding 104, and a gate. The example primary side 108 comprises a push-low FET 118 having a drain coupled to the lead 114 of the primary winding 104, a source coupled to a reference voltage on the primary side 108, and a gate. In the example push phase, the push-high FET 116 and the push-low FET 118 are made conductive, thus coupling the input voltage $V_{DC}$ to the primary winding 104 in the first polarity. From a nomenclature standpoint then, the "push" designation of the FETs 116 and 118 indicates activity or conductivity in the push phase, the "high" designation references location in the example figure (e.g., the upper portion of the bridge configuration), and the "low" designation references location in the example figure (e.g., the lower portion the bridge configuration).

Still referring to FIG. 1, the example primary side 108 further comprises a pull-high FET 120 having a drain coupled to the positive terminal of the input voltage $V_{DC}$, a source coupled to the lead 114 of the primary winding 104, and a gate. The example primary side 108 further comprises a pull-low FET 122 having a drain coupled to the lead 112, a source coupled to the reference voltage on the primary side 108, and a gate. In the example pull phase, the pull-high FET 120 and the pull-low FET 122 are made conductive, thus coupling the input voltage $V_{DC}$ to the primary winding 104 in the second polarity. Again considering nomenclature, the "pull" designation of the FETs 120 and 122 indicates activity or conductivity in the pull phase, and the "high" and "low" designations are again in reference to locations in the example figure.

The primary winding 104 of the transformer 102 is shown in equivalent circuit form comprising a leakage inductance 124, a magnetizing inductance 126, and an ideal winding 128. It will be understood that the transformer 102 does not physically include the separate and distinct inductances and winding as shown; however, the primary winding 104 of the transformer 102 is shown in this form to highlight the presence of the leakage inductance 124, as the leakage inductance 124 plays a role in creation of the current spikes and voltage excursion on the secondary side 110, as discussed in more detail below.

Still referring to FIG. 1, the secondary winding 106 of the transformer 102 defines a lead 130 and a lead 132, and the voltage developed on the secondary winding 106 alternates polarities based on the "dot" conventions shown and based on the polarity of the connection of the input voltage $V_{DC}$ to the primary winding 104. The example secondary side 110 implements an active full-bridge rectification, and the example secondary side 110 rectifies the voltage and current produced on the secondary winding 106 and applies the rectified current and voltage to an output inductor 134 and output capacitor 136. In particular, the output inductor 134 includes a first lead that defines a phase node 137, and a second lead that defines the positive terminal of the output voltage $V_{OUT}$. The output capacitor 136 defines a first lead coupled to the output voltage $V_{OUT}$, and a second lead coupled to a reference voltage on the secondary side 110 (the reference voltage sometimes referred to as "common" given the isolation provided by the transformer 102). The first lead of the output inductor 134 being referred to as the phase node 137 is based on the possibility that multiple power converters 100 are implemented in parallel to supply a downstream load, and the examples of the active clamping are performed within each power converter (e.g., each phase) with respect to the phase node 137.

In example cases, the active full-bridge rectification on the secondary side 110 is implemented by four electrically-controlled rectifiers. In many cases, the electrically-controlled rectifiers are electrically-controlled switches in the form of transistors, and in one example the electrically-controlled switches are FETs. However, any suitable electrically-controlled rectifier may be used. Hereafter, the electrically-controlled rectifiers are drawn as FETs but referred to as "rectifiers" to avoid confusion with the FETs on the primary side 108. In particular, the example secondary side 110 comprises a push-high rectifier 138 having a drain coupled to the phase node 137, a source coupled to the lead 130 of the secondary winding 106, and a gate. The example secondary side 110 further comprises a push-low rectifier 140 having a drain coupled to the lead 132 of the secondary winding 106, a source coupled to the reference voltage on the secondary side 110, and a gate. In the example push phase, the push-high rectifier 138 and the push-low rectifier 140 are made conductive, thus coupling the voltage developed on the secondary winding 106 to the phase node 137. As before, the "push" designation of the rectifiers 138 and 140 indicates activity or conductivity in the push phase, the "high" designation references location in the example figure (e.g., the upper portion of the secondary bridge configuration), and the "low" designation references location in the example figure (e.g., the lower portion the secondary bridge configuration).

The example secondary side 110 further comprises a pull-high rectifier 142 having a drain coupled to the phase node 137, a source coupled to the lead 132 of the secondary winding 106, and a gate. The example secondary side 110 further comprises a pull-low rectifier 144 having a drain coupled to the lead 130 of the secondary winding 106, a source coupled to the reference voltage on the secondary side 110, and a gate. In the example pull phase, the pull-high rectifier 142 and the pull-low rectifier 144 are made conductive, thus coupling the voltage developed on the secondary winding 106 to the phase node 137. As before, the "pull" designation of the rectifiers 142 and 144 indicates activity or conductivity in the pull phase, and the "high" and "low" designations are again in reference to locations in the example figure.

Still referring to FIG. 1, the example power converter 100 further comprises controller 146. The example controller 146 may take the form of a packaged semiconductor device or a packaged integrated circuit device defining a plurality of electrical terminals. In the example case, the controller 146 defines a push terminal 148, a pull terminal 150, a clamp terminal 152, and a feedback terminal 154. Additional terminals would be present (e.g., power, ground/common), but the additional terminals are not shown so as not to unduly complicate the figure. The feedback terminal 154 is coupled to the output voltage $V_{OUT}$ such that the controller 146 receives a signal indicative of output voltage $V_{OUT}$. In the example, the feedback terminal 154 is coupled directly to the output voltage $V_{OUT}$, but in other cases the signal indicate of the output voltage $V_{OUT}$ may be a scaled representation, such as created by a voltage divider or using an optocoupler.

The example push terminal 148 is coupled to the gate of the push-high FET 116 and the gate of the push-low FET 118 by way of an example gate driver circuit or driver circuit 160. The example driver circuit 160 may take any suitable form, such as a FAN8811 FET driver integrated circuit available from ON Semiconductor of Phoenix, Arizona. That is, a single asserted signal from the push terminal 148 asserts the gates of both the push-high FET 116 and the push-low FET 118. For reasons that will become clearer below, the push terminal 148 is further coupled to the gate of the pull-high rectifier 142 and the gate of the pull-low rectifier 144 by way of a NOT gate 156 and an example driver circuit 166. The example driver circuit 166 may likewise take any suitable form, such as a FAN8811 FET driver integrated circuit. That is, the single asserted signal from the push terminal 148 also de-asserts the gates of both the pull-high rectifier 142 and the pull-low rectifier 144. Stated oppositely, the de-assertion of the signal from the push terminal 148 also asserts the gates of both the pull-high rectifier 142 and the pull-low rectifier 144.

The example pull terminal 150 is coupled to the gate of the pull-high FET 120 and the gate of the pull-low FET 122 by way of an example gate driver circuit or driver circuit 164. The driver circuit 164 may take any suitable form, such as a FAN8811 FET driver integrated circuit. That is, a single asserted signal from the pull terminal 150 asserts the gates of both the pull-high FET 120 and the pull-low FET 122. Again for reasons that will become clearer below, the pull terminal 150 is further coupled to the gate of the push-high rectifier 138 and the gate of the push-low rectifier 140 by way of an a NOT gate 158 and an example driver circuit 162. The driver circuit 162 may likewise take any suitable form, such as a FAN8811 FET driver integrated circuit. That is, the single asserted signal from the pull terminal 150 also de-asserts the gates of both the push-high rectifier 138 and the push-low rectifier 140. Stated oppositely, the de-assertion of the signal from the pull terminal 150 also asserts the gates of both the push-high rectifier 138 and the push-low rectifier 140.

Figure 2:
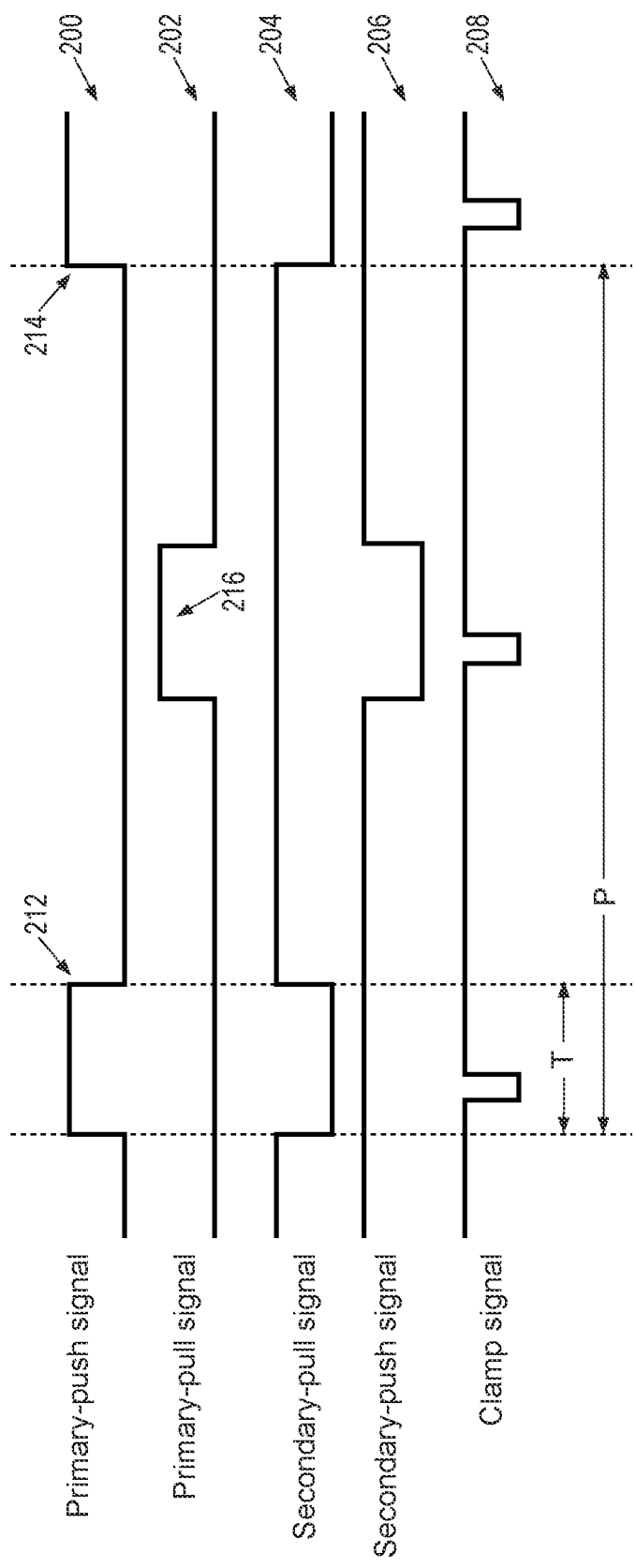
FIG. 2 shows a timing diagram in accordance with at least some example embodiments.

FIG. 2 shows a timing diagram of various signals driven by the example controller 146 and resultant signals (such as created by the NOT gates 156 and 158). In particular, FIG. 2 shows a primary-push signal 200, a primary-pull signal 202, a secondary-pull signal 204, a secondary-push signal 206, and a clamp signal 208. As the name implies, the primary-push signal 200 is applied to the gates of the push-high FET 116 and the push-low FET 118 during operation of the power converter 100. The example primary-push signal 200 is shown as asserted high, but in other cases the signal may be asserted low. FIG. 2 shows one full assertion 212 and one partial assertion 214 of the primary-push signal 200. Assertion of the example primary-push signal 200 occurs at a period P defined between any two consistent features of the primary-push signal 200. In the example shown, the period P is defined between rising edges of the primary-push signal 200, and the period P implies an operating frequency being the inverse of the period (f=1/P). In many cases, the controller 146 operates at a predetermined and fixed frequency.

The duration of each assertion of the example primary-push signal 200 defines a duty cycle, such as asserted time T in the figure. In example cases, the controller 146 controls or adjusts the duty cycle of the primary-push signal 200 (as well as the primary-pull signal 202) to control the output voltage $V_{OUT}$, and the control may be based on a signal indicative of output voltage $V_{OUT}$ received on the feedback terminal 154 (FIG. 1). In example embodiments, the asserted duration of the primary-push signal 200 represents or defines the push phase discussed above.

FIG. 2 further shows the primary-pull signal 202. As the name implies, the primary-pull signal 202 is applied to the gates of the pull-high FET 120 and the pull-low FET 122 during operation of the power converter 100. The example primary-pull signal 202 is shown as asserted high, but in other cases the signal may be asserted low. FIG. 2 shows one full assertion 216 of the primary-pull signal 202. Assertion of the example primary-pull signal 202 occurs at the same period P as the primary-push signal 200, but the period of the primary-pull signal 202 is not specifically delineated in FIG. 2 so as not to unduly complicate the figure. It follows that the primary-pull signal 202 has the same operating frequency as the primary-push signal 200, but at a phase shift (e.g., 180 degrees) relative to the primary-push signal 200. The duration of each assertion of the example primary-pull signal 202 defines a duty cycle, but the duration of the assertion 216 of the primary-pull signal 202 is not delineated in FIG. 2 so as not to unduly complicate the figure. In example cases, the controller 146 controls or adjusts the duty cycle of the primary-pull signal 202 to control the output voltage $V_{OUT}$. In most cases, the duty cycle of the primary-pull signal 202 will match the duty cycle of the primary-push signal 200, except during transient load changes. In example embodiments, the asserted duration of the primary-pull signal 202 represents or defines the pull phase discussed above.

FIG. 2 further shows the secondary-pull signal 204. As the name implies, the secondary-pull signal 204 is applied to the gates of the pull-high rectifier 142 and the pull-low rectifier 144 during operation of the power converter 100. The example secondary-pull signal 204 is shown as asserted high, but in other cases the signal may be asserted low. Conceptually, the pull-high rectifier 142 and the pull-low rectifier 144 are conductive during periods when the pull-high FET 120 and the pull-low FET 122 are conductive—during the pull phase. In example systems, the pull-high rectifier 142 and the pull-low rectifier 144 are conductive for extended durations before and after the pull phase, as shown by the secondary-pull signal 204. In particular, in the example system the pull-high rectifier 142 and the pull-low rectifier 144 are conductive at all times except during conductive times of the push-high FET 116 and the push-low FET 118. Stated differently, the pull-high rectifier 142 and the pull-low rectifier 144 are conductive at all times except during push phase. Stated in terms of the signals of FIG. 2, the secondary-pull signal 204 is de-asserted contemporaneously with assertion of the primary-push signal 200, and the secondary-pull signal 204 is asserted contemporaneously with de-assertion of the primary-push signal 200. It follows that the gates of the pull-high rectifier 142 and the pull-low rectifier 144 are asserted at the operating frequency of the controller 146, and that the duty cycle of the signal applied to the gates of the pull-high rectifier 142 and the pull-low rectifier 144 is one minus the duty cycle of the assertions of the primary-pull signal 202 (if the duty cycle is expressed as a positive value less than one).

FIG. 2 further shows the secondary-push signal 206. As the name implies, the secondary-push signal 206 is applied to the gates of the push-high rectifier 138 and the push-low rectifier 140 during operation of the power converter 100. The example secondary-push signal 206 is shown as asserted high, but in other cases the signal may be asserted low. Conceptually, the push-high rectifier 138 and the push-low rectifier 140 are conductive during periods when the push-high FET 116 and the push-low FET 118 are conductive—during the push phase. In example systems, the push-high rectifier 138 and the push-low rectifier 140 are conductive for extended durations before and after the push phase, as shown by the secondary-push signal 206. In particular, in the example system the push-high rectifier 138 and the push-low rectifier 140 are conductive at all times except during conductive times of the pull-high FET 120 and the pull-low FET 122. Stated differently, the push-high rectifier 138 and the push-low rectifier 140 are conductive at all times except during pull phase. Stated in terms of the signals of FIG. 2, the secondary-push signal 206 is de-asserted contemporaneously with assertion of the primary-pull signal 202, and the secondary-push signal 206 is asserted contemporaneously with de-assertion of the primary-pull signal 202. It follows that the gates of the push-high rectifier 138 and the push-low rectifier 140 are asserted at operating frequency of the controller 146, and that the duty cycle of the signal applied to the gates of the push-high rectifier 138 and the push-low rectifier 140 is one minus the duty cycle of the assertions of the primary-pull signal 202 (if the duty cycle is expressed as a positive value less than one).

FIG. 2 also shows the clamp signal 208. The clamp signal 208 will be discussed after discussion of voltage and/or current excursions of the phase node 137 during operation caused, at least in part, by the leakage inductance 124.

Returning to FIG. 1. Consider, for purposes of explanation, that the example power converter 100 is operating and producing the output voltage $V_{OUT}$. Further consider that the primary side 108 is within a rest phase defined between the push phase and the pull phase. Stated differently, consider that the push-high FET 116, the push-low FET 118, the pull-high FET 120, and the pull-low FET 122 are all non-conductive. From the timing diagram of FIG. 2, it follows that all the rectifiers on the secondary side 110 are conductive. During the rest phase, no current flows through the primary winding 104.

Figure 3:
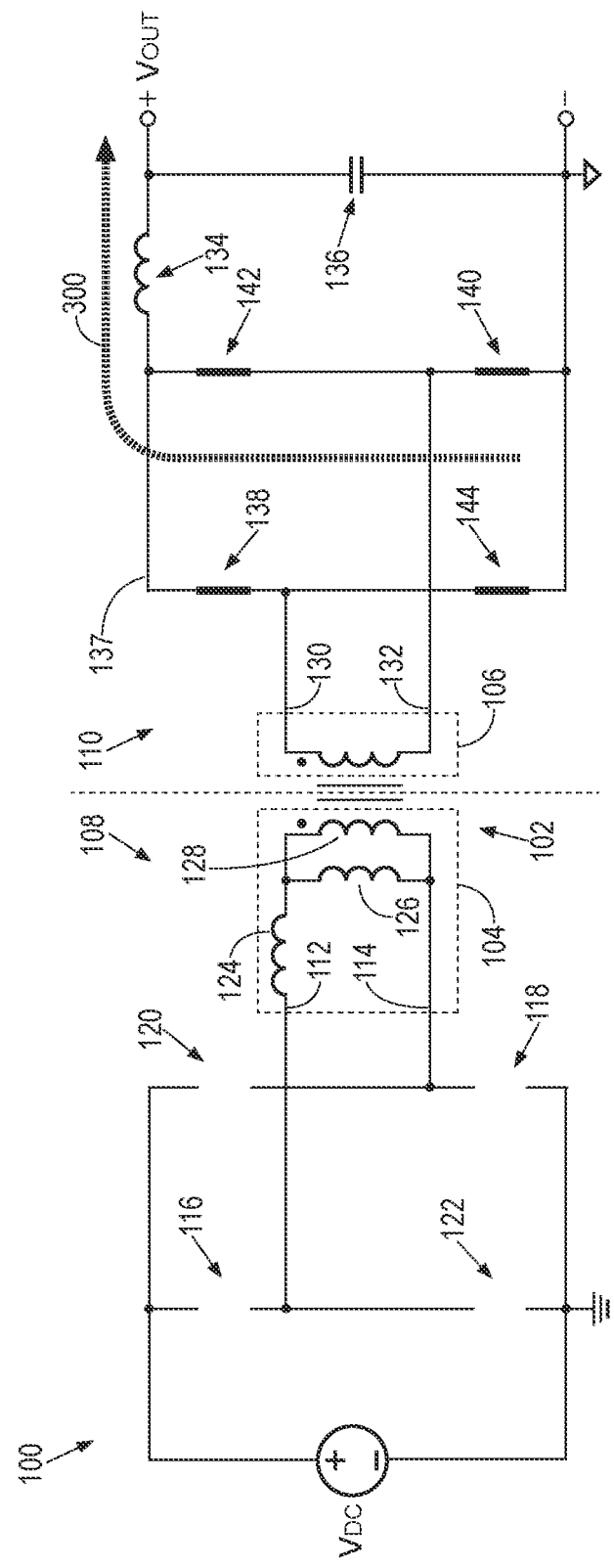
FIG. 3 shows a simplified schematic of the power converter in accordance with at least some embodiments.

FIG. 3 shows a simplified schematic of the power converter 100 in the example rest phase. In FIG. 3, the FETs are non-conductive and thus shown as open circuits, and the rectifiers are conductive and thus shown as short circuits in the form of heavy lines. During the rest phase, residual current through the output inductor 134 (caused by last charging of the output inductor 134) continues to flow, and thus the output inductor 134 draws the residual current through any or all the secondary rectifiers, as shown by line 300. Thus, during the rest phase the voltage on the phase node 137 is effectively the reference voltage on the secondary side 110 (e.g., common).

Now consider that the example power converter 100 transitions to the push phase. In the push phase, the push-high FET 116 and the push-low FET 118 are made conductive. Moreover, as shown by the timing diagram of FIG. 2, entry into the push-phase results in making non-conductive the pull-high rectifier 142 and the pull-low rectifier 144, leaving the push-high rectifier 138 and the push-low rectifier 140 conductive.

Figure 4:
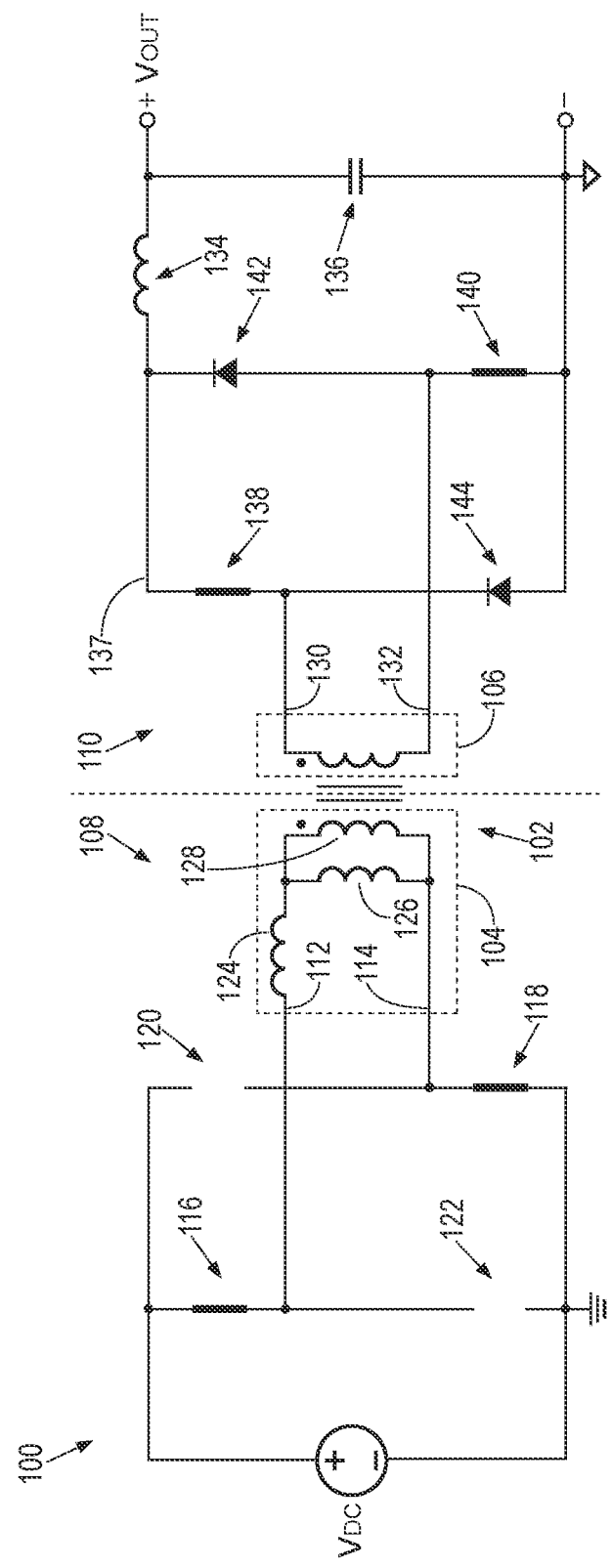
FIG. 4 shows a simplified schematic of the power converter in accordance with at least some embodiments.

FIG. 4 shows a simplified schematic of the power converter 100 in the example push phase. In FIG. 4, the FETs that are non-conductive are shown as open circuits, and FETS that are conductive are shown as short circuits in the form of heavy lines. Similarly, the rectifiers that are conductive are shown as short circuits in the form of heavy lines. The secondary winding 106 has an inductive component and thus cannot change current flow immediately. It follows that initially within the push phase a portion of the residual current through the output inductor 134 flows through the body diode of the pull-high rectifier 142 (and thus shown as a diode), and another portion of the residual current flows through the body diode of the pull-low rectifier 144 (and thus shown as a diode). Thus, the voltage on the phase node 137 initially becomes negative by about a forward voltage drop of a diode (e.g., about 0.7V). The negative voltage at the phase node 137 (hereafter Vd) is reflected across the secondary winding 106, and thus a reflected voltage (hereafter Vr) is developed across the magnetizing inductance 126 and the ideal winding 128, the reflected voltage proportional to the voltage at the phase node 137 multiplied by the turns ration (e.g., Vr=n*Vd).

Still referring to FIG. 4, now consider the primary side 108 during the push phase. In particular, because no primary FETs were conductive in the rest phase, no current flows through the primary winding 104 during the rest phase. When the push phase begins, the push-high FET 116 and the push-low FET 118 become conductive as shown. It follows that the input voltage $V_{IN}$ is applied across the leads 112 and 114 of the primary winding 104 with the first polarity. Moreover, the residual current creating a negative voltage Vd on the secondary side creates the reflected voltage Vr across the magnetizing inductance 126 and the ideal winding 128. Given the polarities of the applied voltages, the voltage across leakage inductance 124 is initially the sum of the input voltage $V_{IN}$ and the reflected voltage Vr. As with any inductor, current does not immediately flow through the leakage inductance 124; rather, the current flow is based on the integral of the applied voltage. Notice, however, that the initial voltage applied across the leakage inductance 124 is higher than the input voltage $V_{IN}$.

Several things happen simultaneously during the initial portion of the push phase. Over time, more and more of the residual current flows through the secondary winding 106. The greater the residual current flow through the secondary winding 106, the greater the reflected current flow on the primary side 108. Similarly, over time more and more current flows through the leakage inductance 124. The greater the current flow through the leakage inductance 124, the greater the net current through the magnetizing inductance 126, and thus greater the voltage developed on the secondary winding 106 attributable to the primary winding 104. Eventually, the current induced in the secondary winding 106 attributable to primary winding 104 overcomes the residual current flow, and the voltage on the phase node 137 rises. In steady state the phase node 137 rises to a voltage of approximately the input voltage $V_{IN}$ multiplied by the turns ratio of the transformer 102. For example, if the input voltage $V_{IN}$ is 48V and the turns ratio is 3:1, once the induced current overcomes the residual current, the voltage on the phase node 137 approaches 16V (e.g., for a designed output voltage $V_{OUT}$ of 12V).

However, before arriving at steady state and in the absence of clamping, the voltage on the phase node overshoots and thus rises above the product of the input voltage $V_{IN}$ multiplied by the turns ratio. Considered in terms of current flow on the secondary side 110 rather than voltage, the secondary winding 106 will tend to produce more current than can immediately flow through the output inductor 134. The excess current is attributable to, at least in part, the leakage inductance 124. For example, in the initial portions of the push mode the voltage across the leakage inductance 124 is higher than the input voltage $V_{IN}$, and thus the energy stored in the field of the leakage inductance 124 eventual manifests itself as excess current flow. The issue may be exacerbated by parasitic capacitances on the secondary side. In particular, at the point in time at which the current induced in the secondary winding 106 attributable to primary winding 104 overcomes the residual current flow, the voltage at the phase node attempts to change polarity, but cannot do so until the parasitic drain-to-source capacitances of the pull-high rectifier 142 and the pull-low rectifier 144 are discharged from their negative charge. Moreover, these same parasitic drain-to-source capacitances have to be charged as the voltage at the phase node 137 rises. Thus, interplay of the leakage inductance 124 and the parasitic capacitances create an excess current flow when the voltage at the phase node 137 reaches the product of the input voltage $V_{IN}$ multiplied by the turns ratio, an thus in the absence of a clamping circuit the excess currents create a voltage spike. The possibility of a voltage spike at the phase node 137 means the circuit designer selects rectifiers (e.g., in the form of FETs) with drain-to-source breakdown voltages higher than the expected voltage spikes. In the example of having an input voltage $V_{IN}$ range of 48V to 60V, a turns ratio of 3:1, and a phase node 137 voltage of 16V to 20V, in the related art the system designer may choose secondary rectifiers (e.g., FETs) with drain-to-source breakdown voltages of 60V or more, in some case 80V.

Figure 5:
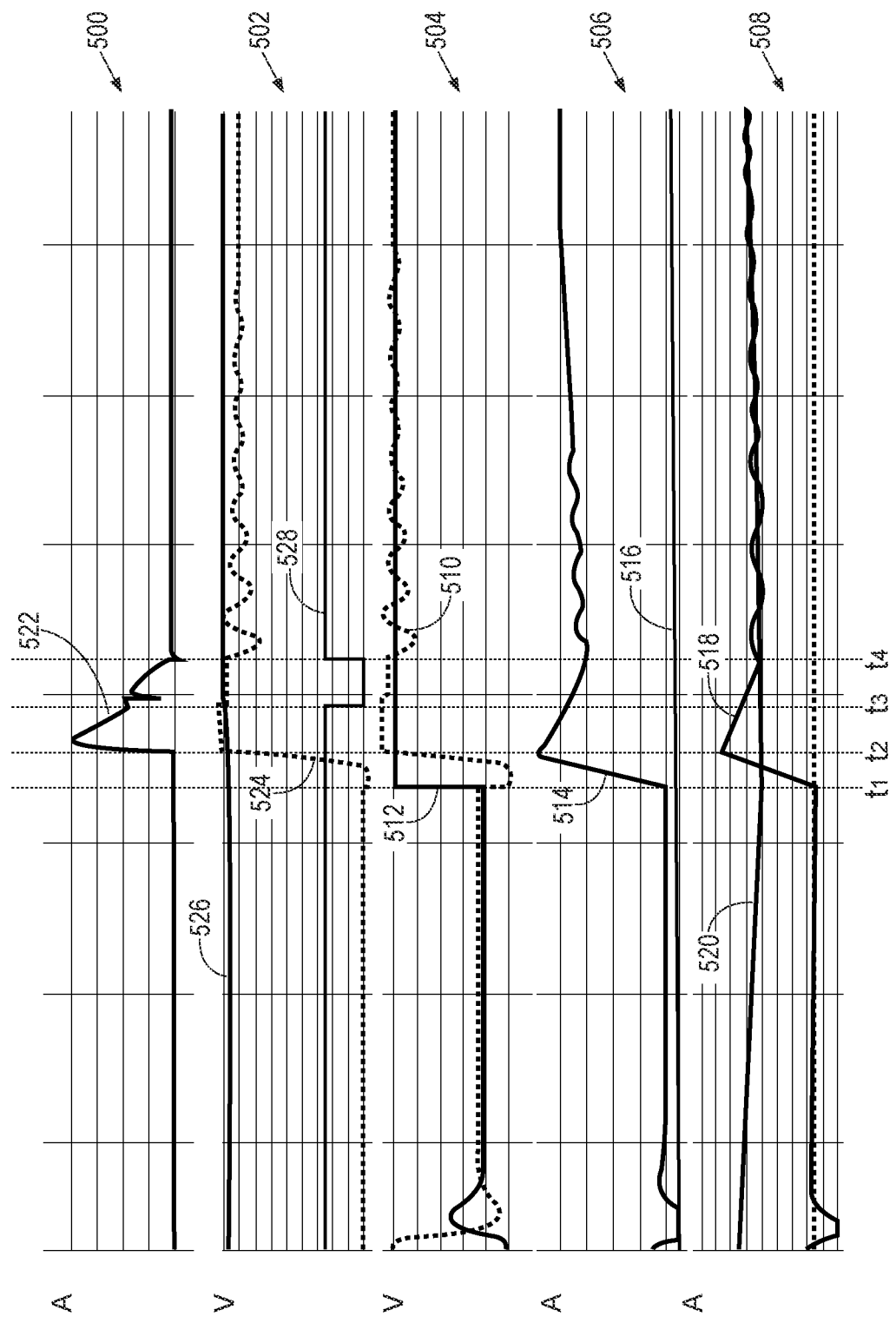
FIG. 5 shows a series of plots of various signals, all on a shared time axis, in accordance with at least some embodiments.

FIG. 5 shows a series of plots of various example signals, all on a shared time axis, and contemporaneously with the push phase. In particular: plot 500 shows a clamp current; plot 502 co-plots a phase node voltage, a clamp capacitor voltage, and a clamp signal; plot 504 co-plots voltage across the magnetizing inductance and a voltage across the primary winding; plot 506 co-plots current through the leakage inductance and current through the magnetizing inductance; plot 508 co-plots current through the secondary winding and current through the output inductance 134. Referring initially to plot 504. Plot 504 shows voltage across the magnetizing inductance (hereafter just magnetizing voltage 510) and the voltage across the leads 112 and 114 of the primary winding 104 (hereafter just primary voltage 512) in the transition between the rest phase (prior to time t1) and the example push phase (the transition starting at time t1). It will be understood that the magnetizing voltage 510 cannot be directly measured, as such is a manifestation of the model of the transformer 102. Prior to time t1 the primary winding 104 is electrically floated as the primary-side FETs are non-conductive. The parasitic drain-to-source capacitances of the primary-side FETs result in a floating voltage on the primary winding 104. Nevertheless, at time t1 the example push phase begins by making conductive the push-high FET 116 and the push-low FET 118, and making non-conductive the pull-high rectifier 142 and the pull-low rectifier 144. The primary voltage 512 thus rises to the input voltage $V_{IN}$, in this example about 48V. The magnetizing voltage 510, however, initial goes negative (just after t1), as caused the residual current flowing through body diodes on the secondary side 110, as discussed above. However, over time the magnetizing voltage 510 rises, eventually rising above the primary voltage 512 at time t2. The time duration between the beginning of the example push phase at t1, and the magnetizing voltage 510 rising above the input voltage $V_{DC}$ is referred to as $T_{OSS}$. The time duration $T_{OSS}$ is correlated to the how quickly the FETs on the primary side 108 and the rectifiers (also FETs) on the secondary side 110 can transition conductive states, and the time duration $T_{OSS}$ is largely independent of the input voltage $V_{DC}$. The magnetizing voltage 510 stays above the primary voltage 512 for a duration, and then eventually experiences a damped oscillation with a final value approaching the primary voltage 512. The reason for the magnetizing voltage rising above the primary voltage 512 is discussed with respect to plot 506.

Plot 506 shows current through the leakage inductance 124 (hereafter just leakage current 514) and current through the magnetizing inductance 126 (hereafter just magnetizing current 516). It will be understood that the magnetizing current 516 cannot be directly and independently measured, as such is a manifestation of the model of the transformer 102. Nevertheless, at time t1 the example push phase begins as described above. The leakage current 514 starts at zero, given the prior rest phase of the primary side 108. Leakage current 514 rises over time, and experiences a peak at time t2. As discussed above, the initial charging voltage applied to the leakage inductance 124 is greater than the input voltage $V_{IN}$. Moreover, the secondary side initially appears as a short circuit as the parasitic capacitances of the rectifiers (FETS) on secondary side 110 are charged, further extending the time the leakage inductance 124 sees higher applied voltage for lack of a back electromotive force (EMF). All these factors working together thus charge the field of the leakage inductance 124, causing the leakage current 514 to spike as shown at time t2. Mathematically, the peak current of the leakage inductance 124 may be given as follows:

$$L_{PP}=I_O/N+T_{OSS}\times(V_{DC}+NVd)/L_{LK} \qquad (1)$$

where $L_{PP}$ is the peak of the leakage current, $I_O$ is the current of the output inductor 134 at time t2, N is the turns ratio of the transformer 102, $T_{OSS}$ the time duration between t1 and t2, $V_{DC}$ is the input voltage, Vd is the magnitude of the negative voltage at the phase node 137 caused by the residual current, and LAK is the magnitude of the leakage inductance. Thereafter, the leakage current 514 drops to a lower value, and then experiences a damped oscillation toward the magnetizing current 516. The specification now turns to the manifestation on the secondary side 110 caused by the peak in the leakage current 514.

Plot 508 co-plots current through the secondary winding 106 (hereafter just secondary current 518) and output current through the output inductor 134 (hereafter just inductor current 520). In particular, in the rest phase prior to time t1 the inductor current 520 is falling over time. The inductor current 520 prior to and just after time t1 was referred above as residual current. At time t1, the example push phase begins. Based on operation of the transformer 102, the leakage current 514 is transferred across to the secondary side 110. In particular, the secondary current 518 is related to the leakage current 514 by the turns ratio. Assuming the example turns ratio from above of 3:1, the secondary current 518 would be three times the leakage current 514. Thus, in the example situation of FIG. 5 where the leakage current 514 peaks at about 10 A, the secondary current 518 may peak about 30 A as shown. Inductor current 520 through the output inductor 134 cannot change instantaneously, thus resulting in excess current on the secondary side 110 that, if not clamped in some form, may result in a corresponding voltage spike or voltage excursion of the phase node 137.

Returning to FIG. 1. The example power converter 100 further comprises a clamp circuit 180. The example clamp circuit 180 comprises a diode 182 having an anode coupled to the phase node 137 and a cathode. In the example of FIG. 1, the diode 182 is the body diode of an electrically-controlled switch in the form of a FET (hereafter clamp FET 184). However, in other cases the diode 182 may be a separate and distinct component. The example clamp FET 184 has a first connection or drain (defining the anode of the diode 182), a second connection or source (defining the cathode of the diode 182) coupled to the phase node 137, and a control input or gate coupled to the clamp terminal 152. While in some cases the gate of the clamp FET 184 may directly couple to the clamp terminal 152, in other cases intervening circuitry may be used, and example intervening circuitry is discussed more below. The example clamp circuit 180 further comprises a clamp capacitor 186 having a first lead coupled to the cathode of the diode 182, and a second lead coupled to the reference voltage on the secondary side 110. In various example systems, the diode 182 extracts current from the phase node 137 and applies the current to the clamp capacitor 186 when a voltage on the phase node 137 exceeds an excursion voltage. Stated in terms of excess current, in example systems the diode 182 extracts excess current from the phase node 137 and stores the current on the clamp capacitor 186. Extraction of current from the phase node 137 during periods of excess current limits the excursion voltage of the phase node 137 and thus enables the circuit designer to select rectifiers (e.g., FETs) with lower drain-to-source breakdown voltage, significantly decreasing the cost of the power converter 100.

Returning again to the plots of FIG. 5. Plot 500 shows an example clamp current 522. The clamp current 522 is based on or caused by the leakage current 514 (plot 506), the secondary current 518 (plot 508), and the inductor current 520 (plot 508). In example systems, excess current flow within the secondary side 110 is provided to the clamp capacitor 186, the excess current being the difference between secondary current 518 (plot 508) and the inductor current 520 (plot 508). A bit more mathematically, the peak clamp current may be given as follows:

$$I_{CLAMP} = N \times T_{OSS} \times (V_{DC} + NVd)/L_{LK} \qquad (2)$$

where $I_{CLAMP}$ is the peak clamp current, and the remaining parameters are as described above.

In accordance with various examples, the clamp current initially flows through the diode 182. Thereafter, and while the clamp current 522 is still flowing, the clamp FET 184 is made conductive. When the clamp current 522 flows through the diode 182, the voltage on the phase node 137 is about 0.7V higher than the voltage on the clamp capacitor 186. In order to reset the voltage on the clamp capacitor 186 for the next operation (e.g., the upcoming pull phase if the present phase is the push phase, or the upcoming push phase if the present phase is the pull phase), the clamp FET 184 is made conductive (e.g., at time t3). In some cases, the clamp FET 184 is made non-conductive just prior to the ceasing of the clamp current 522. In this way, the clamp FET 184 is made conductive and non-conductive in conditions that represent zero current flow through clamp FET 184, or approaching zero voltage switching, to reduce switching losses.

Finally, plot 502 shows voltage on the phase node 137 (hereafter phase node voltage 524), voltage on clamp capacitor (clamp voltage 526), and a clamp signal 528. In particular, at time t1 the example phase node voltage 524 goes negative as caused the residual current flowing through body diodes on the secondary side 110 as discussed above. The phase node voltage 524 then rises with rising secondary current 518 (plot 508), reaching a peak at time t2. At time t2, the phase node voltage 524 exceeds the clamp voltage 526, and current begins to flow through the diode 182. Thus, the phase node voltage 524 is limited or clamped, at about a diode forward voltage drop above the clamp voltage 526. In order to keep the clamp capacitor 186 from becoming a peak detector, while the clamp current 522 is still flowing, the clamp FET 184 is made conductive, in the example at time t3, according to the clamp signal 528. The example clamps signal 528 is shown asserted low. The clamp FET 184 is then made non-conductive just prior to the ceasing of the clamp current 522, such as being made non-conductive at time t4. As shown plot 502, making the clamp FET 184 conductive makes the phase node voltage 524 and the clamp voltage 526 about equal, resetting the clamp capacitor 186 for the next clamp usage. The specification now turns to timing consideration with respect to timing of making the clamp FET 184 conductive and non-conductive.

Returning again to FIG. 1. In some cases, making the clamp FET 184 conductive may be responsive to monitoring a signal within the power converter 100. For example, the controller 146 may define a monitor terminal 188 coupled to a current transformer 190 within the clamp circuit 180. By monitoring the current flow into the clamp circuit 180, the controller 146 may sense when current is being extracted, and thus control timing of making the clamp FET 184 conductive, as well as the duration of conducting current through the clamp FET 184, based on the measured current.

It turns out, however, that the timing of the peak of the current through the leakage inductance 124, and thus the timing of the peak of the current through the secondary winding 106, are only weakly correlated to the input voltage $V_{IN}$ and the load carried by the power converter 100. Moreover, as discussed above, the time duration $T_{OSS}$ is largely uncorrelated to the input voltage $V_{DC}$ and the load carried by the power converter 100. It follows that the length of time excess current flows into the clamp capacitor 186 is only weakly correlated to the input voltage $V_{IN}$ and the load carried by the power converter 100. Moreover, the duration of the clamp FET 184 being conductive has very little or no correlation to the input voltage $V_{IN}$ or the load carried by the power converter 100. That is, as the goal of making the clamp FET 184 conductive is to equalize the clamp voltage 526 to the phase node voltage 524, the limiting factor is how quickly the clamp FET 184 can transition from non-conductive to fully conductive (again, referred at $t_{RR}$). Thus, in some example systems, the timing of asserting the clamp signal 528 may be a predetermined time held within the controller 146. Moreover, the time duration of the clamp FET 184 being conductive may be a predetermined time, also held within the controller 146.

Referring simultaneously to FIGS. 1 and 5, the controller 146 starts the example push phase by asserting the push terminal 148. Assertion of the push terminal 148 makes the push-high FET 116 and the push-low FET 118 conductive. Thus, the controller 146 knows and controls the time t1. The controller 146 initially refrains from asserting the clamp terminal 152, the refraining for a first predetermined duration after assertion of the push terminal 148. That is, starting at time t1 current is building in the leakage inductance 124, and the current peaks at time t2. As discussed above, the excess current on the secondary side 110 initially flows through the diode 182. Moreover, the excess current continues to flow through the diode 182 until the clamp FET 184 is made conductive. In example cases, the first predetermined duration is the time duration between t1 and t3. Given the loose dependence of $T_{OSS}$ on other parameters, in one example case the first predetermined duration, in which the controller 146 refrains from asserting the clamp terminal 152, is about twice the time duration of $T_{OSS}$. Stated differently, though the time duration $T_{OSS}$ is defined between time t1 and t2, the controller 146 waits an additional time duration about equal to the time duration $T_{OSS}$ after the peak current point before asserting the clamp terminal 152. Thereafter, the controller 146 asserts the clamp terminal 152 at time t3, which asserts the gate of the clamp FET 184, and which equalizes the clamp voltage 526 and the phase node voltage 524. The controller 146 asserts the clamp terminal 152 for a second predetermined duration of time (e.g., slightly longer than the $t_{RR}$ of the clamp FET 184). Thus, the controller 146 may operate the power converter 100, including the clamping aspects of the phase node 137, without directly measuring phase node voltage 524 or clamp current 522.

The description the various signals of FIG. 5 have all been in relation to the example push phase. However, the same issues occur during the pull phase, except with opposite polarity on the primary side 108, and across opposite rectifiers on the secondary side 110. That is, because of the rectification on the secondary side, the excess current caused by the leakage inductance 124 again causes excess currents during the pull phase on the secondary side 110, and thus voltage spikes or voltage excursions on the phase node 137. One having ordinary skill, with the benefit of this disclosure, now understanding interaction of the leakage inductance 124 and the phase node 137 during the push phase, understands interaction of the leakage inductance 124 and the phase node 137 during the pull phase, and thus so as not to unduly lengthen the specification the description is not repeated with respect to the pull phase.

Figure 6:
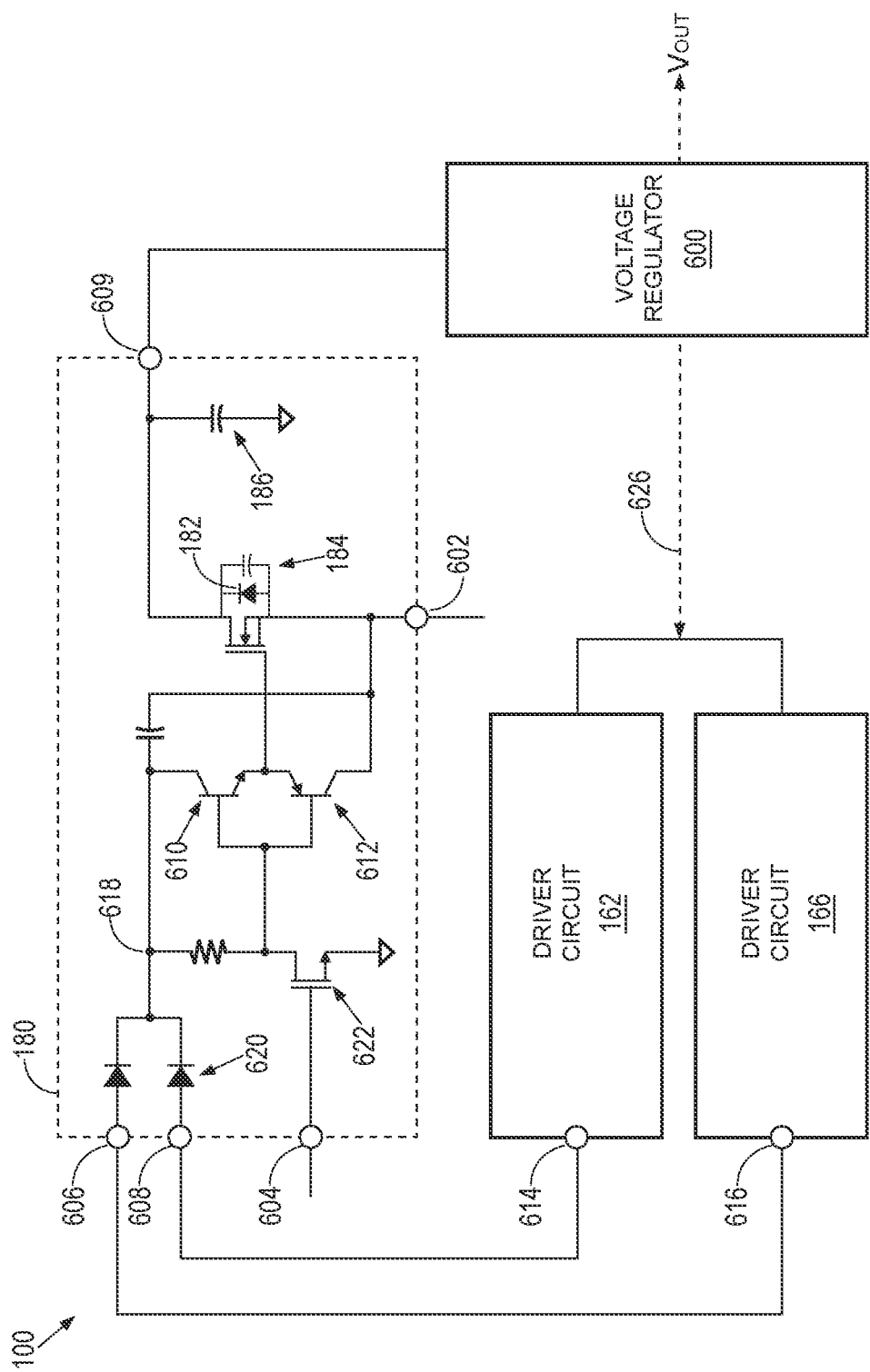
FIG. 6 shows a partial block diagram of a power converter in accordance with at least some embodiments.

FIG. 6 shows partial block diagram of the example power converter 100. In particular, FIG. 6 shows an example clamp circuit 180 in greater detail, along with the driver circuit 162, and the driver circuit 166. FIG. 6 further show a voltage regulator 600. The example clamp circuit 180 defines a phase node input 602, a clamp input 604, a power input 606, a power input 608, and a power output 609. The example clamp circuit 180 comprises the clamp FET 184, including the internal body diode 182. As before, the drain of the example clamp FET 184 is coupled to the clamp capacitor 186. The phase node input 602 is coupled to the source of the clamp FET 184 (and the anode of the diode 182), but the phase node 137 itself is not shown in FIG. 6 so as not to unduly complicate the figure. Also, the clamp input 604 is coupled to the gate of the clamp FET 184 through additional circuitry, discussed below. However, neither the controller 146 nor the clamp terminal 152 (to which the clamp input 604 is coupled) are shown in FIG. 6, again so as not to unduly complicate the figure.

In example systems, the clamp circuit 180 is provided operational power from the driver circuit 162 and/or driver circuit 166 on the secondary side 110. In particular, in the example case of the driver circuits 162 and 166 each being a FAN8811, each of the driver circuits 162 and 166 define an HP terminal or boot terminal. It follows the example driver circuit 162 defines a boot terminal 614, and the boot terminal 614 is coupled to the power input 608. The example driver circuit 166 defines a boot terminal 616, and the boot terminal 616 is coupled to the power input 608. Thus, the clamp circuit 180 may derive operational power form one or both of the driver circuits 162 and 166.

In example systems, the clamp signal 528 (FIG. 5) driven to the clamp terminal 152 (FIG. 1) is an asserted-low signal. Thus, the example clamp circuit 180 comprises additional components to receive the asserted-low signal on the clamp input 604, and drive the gate of the clamp FET 184, illustratively shown as an N-channel FET. In particular, the example clamp circuit 180 defines a power node 618 that is provided operation power from either the driver circuit 162 or the driver circuit 166, or both. Inasmuch the driver circuits 162 and 166 may be operational at different times (e.g., different phases), diodes 620 prevent reverse power flow from the power node 618 to the driver circuits 162 and 166.

The example clamp circuit 180 further comprises a first NPN junction transistor 610 (hereafter just transistor 610) coupled in series with a PNP junction transistor 612 (hereafter just transistor 612). The collector of the transistor 610 is coupled to the power node 618, and the emitter of transistor 612 is coupled to the phase node input 602 (and thus the phase node 137). The emitters of the transistors 610 and 612 are coupled together, defining a node. The gate of clamp FET 184 is coupled to the node between the transistor 610 and the transistor 612 (i.e., coupled to the emitter of transistor 610 and the collector of transistor 612). When the coupled bases are grounded, transistor 610 is non-conductive, transistor 612 is conductive, the voltage on the gate of the clamp FET 184 is about equal to the voltage on its source, and thus the clamp FET 184 is non-conductive. Oppositely, when current flows into the coupled bases, transistor 610 is conductive, transistor 612 is non-conductive, the voltage on the gate of the clamp FET 184 is about equal to the voltage on its drain, and thus the clamp FET 184 is conductive. One of ordinary skill, with the benefit of this disclosure, understands that transistors 610 and 612 are merely an example driver circuit to turn on and off the clamp FET 184, and other methods may also be used.

The example clamp signal 528 (FIG. 5) is coupled to the emitters by way of FET 622. In particular, FET 622 defines a drain coupled to the power node 618 by way of resistor 624, a source coupled to the reference voltage on the secondary side 110, and a gate coupled to the clamp input 604. It follows that when the clamp signal 528 is asserted (e.g., asserted low between times t3 and t4 of FIG. 5), FET 622 is non-conductive, and thus the voltage on the power node 618 is coupled the bases of the transistors 610 and 612. Current flow to the bases makes the transistor 610 conductive, which applies the voltage on the power node 618 to the gate of clamp FET 184. Oppositely, when the clamp signal 528 is de-asserted, FET 622 is conductive, and thus the bases of the transistors 610 and 612 are coupled the reference voltage on the secondary side 110. A lack of current flow to the bases makes the transistor 612 conductive, which couples the gate of the clamp FET 184 to its source, and thus the clamp FET 184 is non-conductive. The combination of the FET 622 and transistors 610 and 612, can be considered a logic NOT gate. One of ordinary skill, with the benefit of this disclosure, understands that the pull-up resistor and FET 622 are merely an example driver circuit to turn on and off the clamp FET 184, and other methods may also be used.

Still referring to FIG. 6. The example clamp circuit 180 defines the power output 609. In some cases, and as shown, energy stored on the clamp capacitor 186 may be regenerated back to the power converter 100. More particularly still, in the example power converter 100 of FIG. 6 the power output 609 is coupled to the voltage regulator 600. The voltage regulator 600 is designed and constructed to regulate the voltage, and apply the regulated output voltage to other components. In one example case, the voltage regulator 600 may apply the regulated output voltage to power one or both of the driver circuits 162 and 166, as shown by dashed line 626. In such cases, the voltage regulator may be a low-dropout (LDO) linear regulator, or a buck-type switching power converter. In these cases, the clamping circuit is said to be self-driven, as the power to drive the clamp FET 184 is derived from the clamp capacitor 186.

In other cases, the voltage regulator 600 may be designed and constructed to apply the regulated output voltage directly to the output voltage $V_{OUT}$, as shown by dashed line 628, to supplement the energy provided through the output inductor 134. In such cases, the voltage regulator may be a buck-type switching power converter. Regardless of whether the regenerated energy goes to the driver circuits 162 and 166, or directly to the output voltage $V_{OUT}$, the amount of energy extracted should be selected to result in relative small voltages drops on the clamp capacitor 186 so as not to adversely affect the camping operations.

Figure 7:
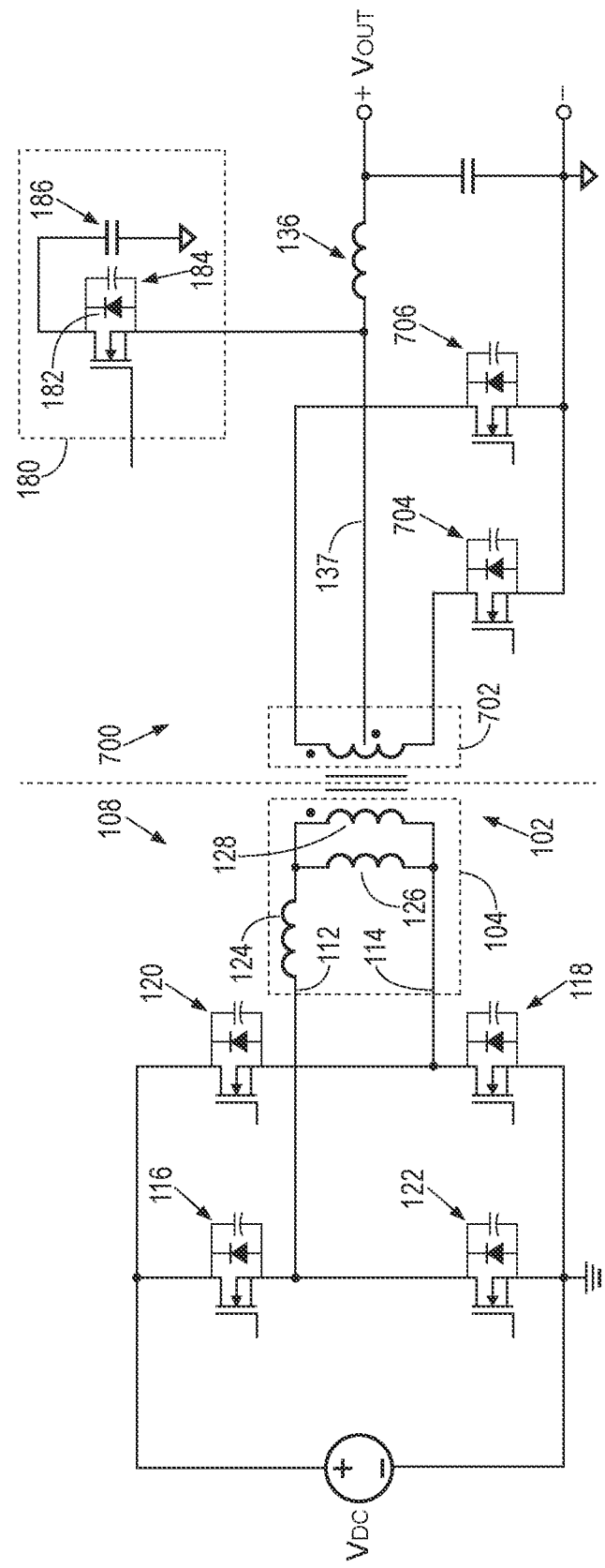
FIG. 7 shows a partial electrical schematic, partial block diagram, of a power converter in accordance with at least some embodiments.

The various embodiments discussed to this point have assumed a full bridge on the primary side 108 and a full bridge on the secondary side 110. However, the issues associated with the leakage inductance of the transformer occur in other, related topologies. FIG. 7 shows a partial electrical schematic, partial block diagram, of a power converter in accordance with at least some embodiments. The primary side 108 is the same as the primary side 108 of FIG. 1, and operates the same. The secondary side 700 is defined by a secondary winding 702 that has a center tap coupled to the output inductor 134 and output voltage $V_{OUT}$ as shown. In configurations operated with a secondary side 700 with a center tap, the number of secondary rectifiers may be reduced to two—a push rectifier 704 (conductive during the push phase) and a pull rectifier 706 (conductive during the pull phase). Regardless, the leakage inductance 124 of the primary winding 104 creates a current spike on phase node 137 and thus the potential for a voltage excursion in both the push phase and the pull phase. Thus, in spite of the center-tap topology of the secondary side 700, the example power converter of FIG. 7 may include a clamp circuit 180, in any of the various forms discussed above, to limit voltage excursions by extracting current from the phase node 137.

Figure 8:
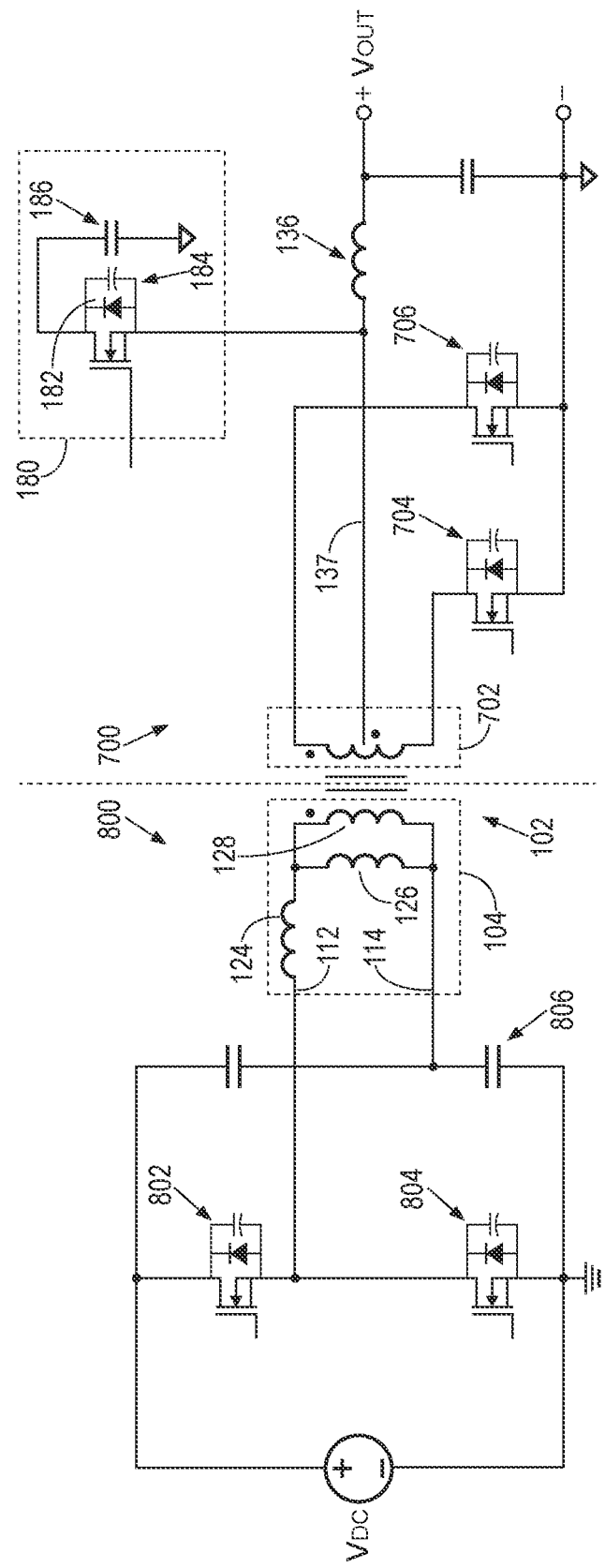
FIG. 8 shows a partial electrical schematic, partial block diagram, of a power converter in accordance with at least some embodiments.

FIG. 8 shows a partial electrical schematic, partial block diagram, of a power converter in accordance with at least some embodiments. In particular, the secondary side is the same as described in FIG. 7—a center tapped secondary winding 702 with a push rectifier 704 and a pull rectifier 706. However, the primary side 800 is shown in a half-bridge configuration. In particular, the primary side 800 defines a push FET 802 coupled to the lead 112 of the primary winding 104, and the lead 114 of the primary winding is coupled to a push capacitor 806. During the push phase, current flows from the input voltage $V_{IN}$, through the push FET 802, through the primary winding 104, and to the push capacitor 806. During the pull phase, the pull FET 804 is conductive and the push FET 802 is non-conductive, and thus current flows in the opposite direction from the push capacitor 806, through the primary winding 104, and then through the pull FET 804 to the reference voltage on the primary side 800. Regardless, the leakage inductance 124 of the primary winding 104 creates a current spike on the phase node 137, and thus the potential for a voltage excursion in both the push phase and the pull phase. Thus, in spite of half-bridge topology on the primary side 800 and the center-tap topology for the secondary side 700, the example power converter of FIG. 8 may include a clamp circuit 180, in any of the various forms discussed above, to limit voltage excursions by extracting current from the phase node 137.

Figure 9:
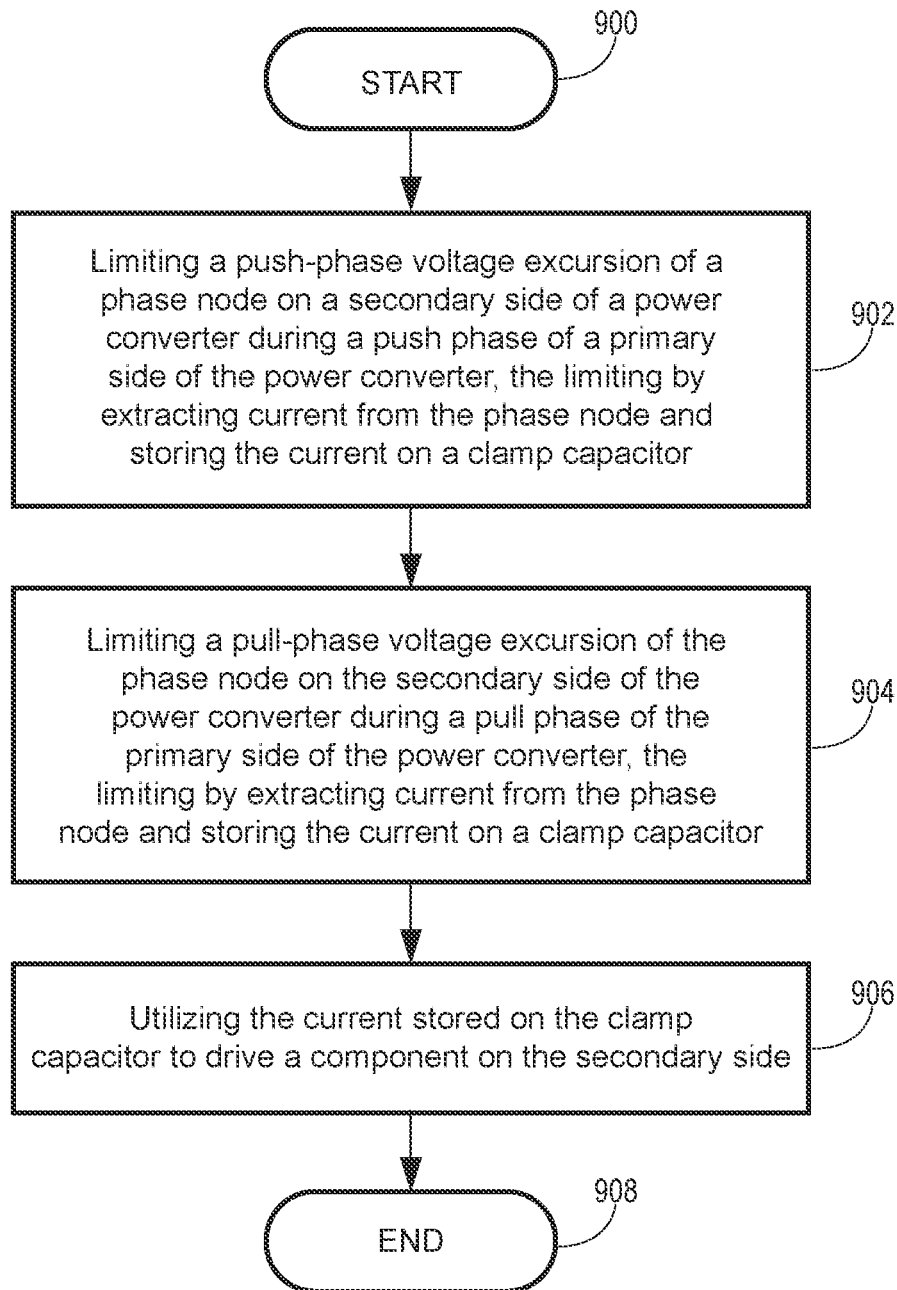
FIG. 9 shows a method in accordance with at least some embodiments.

FIG. 9 shows a method in accordance with at least some embodiments. In particular, the method starts (block 900) and comprises: limiting a push-phase voltage excursion of a phase node on a secondary side of a power converter during a push phase of a primary side of the power converter, the limiting by extracting current from the phase node and storing the current on a clamp capacitor (block 902); limiting a pull-phase voltage excursion of the phase node on the secondary side of the power converter during a pull phase of the primary side of the power converter, the limiting by extracting current from the phase node and storing the current on a clamp capacitor (block 904); and utilizing the current stored on the clamp capacitor to drive a component on the secondary side (block 906). Thereafter, the method ends (block 908).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, the method comprising:
   making, by a controller, a push transistor on a primary side of the power converter conductive in response to a start of a push phase of the power converter;
   making, by the controller, a pull transistor on the primary side of the power converter conductive in response to a start of a pull phase of the power converter;

making, by the controller, a push-high rectifier on a secondary side of the power converter conductive during each in response to the start of the push phase, wherein the push-high rectifier is coupled between a phase node and a first terminal of a secondary winding of a transformer;

making, by the controller, a push-low rectifier on the secondary side of the power converter conductive in response to the start of the push phase, wherein the push-low rectifier is coupled between a second terminal of the secondary winding and a ground node;

making, by the controller, a pull-high rectifier on the secondary side of the power converter conductive in response to the start of the pull phase, wherein pull pull-high rectifier is coupled between the phase node and the second terminal of the secondary winding;

limiting, by a clamp circuit coupled to the phase node, a push-phase voltage excursion of the phase node during the push phase by:
conducting a current from the phase node through a diode to a clamp capacitor in response to determining that a voltage on the phase node exceeds an excursion voltage; and then
coupling the phase node to the clamp capacitor in response to determining a first predetermined time has elapsed since the start of the push phase.

2. The method of claim 1, wherein limiting the push-phase voltage excursion of the phase node during the push phase further comprises decoupling the phase node from the clamp capacitor prior to an end of the push phase.

3. The method of claim 1, wherein coupling the phase node to the clamp capacitor includes
making an electrically-controlled switch conductive for a second predetermined time.

4. The method of claim 3, further comprises utilizing a current in the clamp capacitor to drive the electrically-controlled switch.

5. The method of claim 3, wherein the first predetermined time is twice a time required for the push transistor to transition between conductive states.

6. The method of claim 5, further comprising limiting a pull-phase voltage excursion of the phase node during the pull phase by:
conducting current from the phase node through the diode to the clamp capacitor for the first predetermined time; and then
conducting current through the electrically-controlled switch for the second predetermined time.

7. The method of claim 3, wherein the second predetermined time is a time required for the electrically-controlled switch to transition from non-conductive to fully conductive.

8. The method of claim 1, further comprising conducting the current from the phase node through the diode to the clamp capacitor for the first predetermined time.

9. The method of claim 1, further comprising making, by the controller, a pull-low rectifier on the secondary side of the power converter conductive in response to the start of the pull phase, wherein the pull-low rectifier is coupled between the first terminal of the secondary winding and the ground node.

10. A controller for a power converter, the controller comprising:
a push terminal, a pull terminal, and a clamp terminal;
the controller configured to:
assert the push terminal to operate a push transistor on a primary side of the power converter and a pull rectifier on a secondary side of the power converter, the assertion of the push terminal at a first frequency, a duty cycle, and a first phase, thereby defining a push phase of the power converter;
assert the pull terminal to operate a pull transistor on the primary side and a push rectifier on the secondary side, the assertion of the pull terminal at the first frequency, the duty cycle, and a second phase different than the first phase, thereby defining a pull phase of the power converter; and
assert, in response to a determination that a first duration has elapsed since an assertion of the pull terminal, the clamp terminal to operate an electrically-controlled switch of a clamp circuit.

11. The controller of claim 10, wherein the controller is further configured to de-assert the clamp terminal prior to an end of the pull phase.

12. The controller of claim 11, wherein the controller is further configured to de-assert the clamp terminal prior to the end of the push phase.

13. The controller of claim 10, wherein the assertion of the push terminal to operate the push transistor on the primary side of the power converter and the pull rectifier on the secondary side of the power converter is performed without the controller measuring a voltage at the pull rectifier and a current to the clamp terminal.

14. A power converter, comprising:
a primary circuit configured to apply a voltage of alternating polarity to a primary winding of a transformer;
a secondary circuit configured to rectify an alternating voltage generated on a secondary winding of the transformer;
a clamp circuit including a clamp capacitor, wherein the clamp circuit is coupled to a phase node included in the secondary circuit, wherein the phase node is coupled to the secondary winding via a first electrically-controlled switch, and wherein the clamp circuit is configured to:
couple the phase node to the clamp capacitor in response to an activation of a clamp signal; and
extract a current from the phase node through a diode and apply the current to the clamp capacitor in response to a determination that a voltage on the phase node exceeds an excursion voltage; and
a controller configured to:
store a first predetermined duration;
activate a push phase for the primary circuit; and
assert the clamp signal in response to a determination that the first predetermined duration has elapsed since an activation of the push phase.

15. The power converter of claim 14, wherein the controller is further configured to de-assert the clamp signal in response to a determination that a second predetermined duration has elapsed since an assertion of the clamp signal.

16. The power converter of claim 14, further comprising:
a gate driver circuit defining a power input coupled to a first lead of the clamp capacitor; and
the gate driver circuit coupled to a gate of a push rectifier of the secondary circuit, wherein the gate driver circuit derives power from the clamp capacitor.

17. The power converter of claim 14, wherein the primary circuit includes:
a push-high transistor coupled between an input voltage source and a first lead of the primary winding;
a pull-low transistor coupled between the first lead and a reference node for the primary circuit;
a push-low transistor coupled between a second lead of the primary winding and the reference node; and a pull-high transistor coupled between the input voltage source and the second lead.

18. The power converter of claim 17, wherein the secondary circuit includes:

the secondary winding of the transformer, the secondary winding having a third lead and a fourth lead;

an output inductor coupled between the phase node and an output node;

a push rectifier coupled between the fourth lead of the secondary winding and a return; and a pull rectifier coupled between the third lead of the secondary winding and the return.

19. The power converter of claim 14, wherein extracting the current from the phase node through the diode to the clamp capacitor is performed for the first predetermined duration without the controller measuring a voltage at the phase node and a current to the clamp capacitor.

20. The power converter of claim 14, wherein to assert the clamp signal, the controller is further configured to assert the clamp signal for a second predetermined duration being a time required for a second electrically-controlled switch to transition from non-conductive to fully conductive, wherein the second electrically-controlled switch is coupled between the clamp capacitor and the phase node.

* * * * *